(12) United States Patent
Ackermann et al.

(10) Patent No.: US 8,065,580 B2
(45) Date of Patent: Nov. 22, 2011

(54) REDUNDANT TRANSMISSION OF DATA MESSAGES FOR INFORMATION AND CONTROL FOR HVDC TRANSMISSION SYSTEMS

(75) Inventors: Anja Ackermann, Obermichelbach (DE); Michael Festor, Heroldsberg (DE); Frank Greiner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1021 days.

(21) Appl. No.: 11/916,386

(22) PCT Filed: Jun. 2, 2005

(86) PCT No.: PCT/DE2005/001025
§ 371 (c)(1),
(2), (4) Date: Dec. 3, 2007

(87) PCT Pub. No.: WO2006/128398
PCT Pub. Date: Dec. 7, 2006

(65) Prior Publication Data
US 2008/0178056 A1    Jul. 24, 2008

(51) Int. Cl.
*H04L 1/18* (2006.01)
*G08C 25/02* (2006.01)
(52) U.S. Cl. ......... 714/748; 714/750; 714/751; 714/749
(58) Field of Classification Search ........... 714/748–751
See application file for complete search history.

(56) References Cited

U.S. PATENT DOCUMENTS

| 3,876,979 | A  | * | 4/1975  | Winn et al. ............... 714/748 |
| 6,327,688 | B1 | * | 12/2001 | Stolitzka et al. ........... 714/750 |
| 6,404,739 | B1 |   | 6/2002  | Gonno |
| 6,983,409 | B1 |   | 1/2006  | Vollmer et al. |
| 7,180,896 | B1 |   | 2/2007  | Okumura |
| 2002/0036986 | A1 | * | 3/2002 | Haarsten ................. 370/235 |

FOREIGN PATENT DOCUMENTS

| DE | 10249592 A1 | 6/2004 |
| EP | 0876023 A1  | 11/1998 |
| EP | 1061688 A2  | 12/2000 |
| EP | 1204249 A1  | 5/2002 |

* cited by examiner

*Primary Examiner* — Guy Lamarre
(74) *Attorney, Agent, or Firm* — Laurence A. Greenberg; Werner H. Stemer; Ralph E. Locher

(57) ABSTRACT

A method for securely transmitting data messages in an HVDCT system. Each transmitting unit is connected to each receiving unit via at least two connection channels. Each data message includes a message counter that uniquely characterizes the data message, and each transmitting unit transmits the data message to each receiving unit via all of the connection channels. Each receiving unit calculates a comparison counter and compares it with the message counter in the received data message. If the message counter and the comparison counter do not match, a repetition request is transmitted to the transmitting unit for the purpose of transmitting a message counter that corresponds to the comparison counter. After the repetition request has been received, the transmitting unit accesses a transmission buffer, and the data message whose message counter corresponds to the comparison counter of the repetition request is transmitted via all of the connection channels.

6 Claims, 1 Drawing Sheet

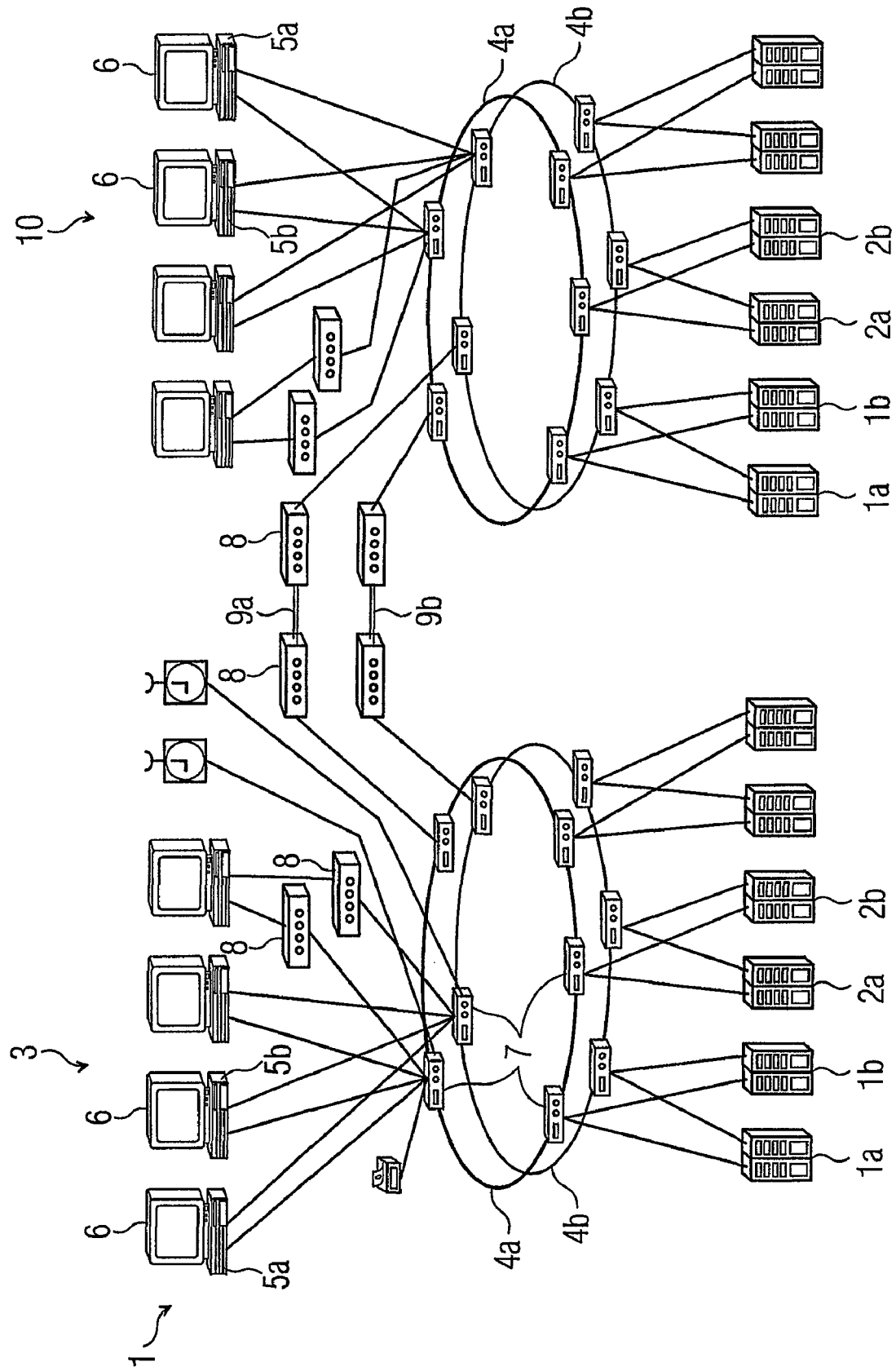

REDUNDANT TRANSMISSION OF DATA MESSAGES FOR INFORMATION AND CONTROL FOR HVDC TRANSMISSION SYSTEMS

Redundant transmission of data messages for information and control for HVDC transmission systems.

BACKGROUND OF THE INVENTION

Field of the Invention

The invention relates to a method for safe and secure transmission of data messages between at least one transmitting unit and at least one receiving unit in an HVDC transmission installation, with each transmitting unit being connected to each receiving unit via at least two connecting channels, in which each data message is provided with a message counter which uniquely identifies that data message, and each transmitting unit sends the data message via all the connecting channels to each receiving unit with the message counter being calculated using an incrementation rule which is clocked by the transmission of the data messages, and each receiving unit calculating a comparison counter using the same incrementation rule, which is clocked by the reception of data messages.

One method such as this is already known from the generally available prior art. In this case, the transmitting unit and receiving unit in already known HVDC transmission installations are connected via redundant connecting channels of which, during normal operation, one connecting channel is used as the preferred channel for normal use and a further connecting channel is used as a reversionary channel, which is not active during normal operation. When data messages are sent, the transmitting unit enters a message counter in each data message, which uniquely identifies that data message. A simple incrementation rule is normally used for this purpose, for example a natural number "n" which is incremented by 1 on each clock cycle: $n=n+1$. The data message is then sent to the receiving unit. The receiving unit receives the data message with the receiving unit using the same incrementation rule to calculate a comparison counter or acknowledgement counter, and then transmitting the comparison counter back to the transmitter. The transmitter compares the message counter with the comparison counter. If they match, that is to say if the comparison is positive, the message counter is incremented using the incrementation rule and a new data message is sent to the receiving unit, with the incremented message counter. The transmission unit sends data messages with the same content until the message counter and the comparison counter match. If no positive comparison is achieved within the previously defined time period, an error is output, followed by switching to the reversionary channel.

The already known method has the disadvantage that dead times of up to 10 seconds can occur in the event of a defect or disturbance. The fact that the comparison counter is always fed back also results in an increased transmission duration for current data.

BRIEF SUMMARY OF THE INVENTION

The invention is therefore based on the object of providing a method of the type mentioned initially, which allows data to be interchanged more quickly between transmitting and receiving units and an HVDC transmission installation and which at the same time complies with the more stringent safety and security requirements for an installation such as this.

The invention achieves this object in that each transmitting unit stores data messages that have already been transmitted in a transmission buffer, and in that the receiving unit compares the message counter of each received data message with the comparison counter, in which case, if there is no match between the message counter and the comparison counter or if there is no match within a waiting period after reception of a data message, a repeat request is sent to the transmitting unit in order to send a data message with a message counter corresponding to the comparison counter, the transmitting unit accesses the transmission buffer after receiving the repeat request and sends the data message via all the connecting channels whose message counter corresponds to the comparison counter received by means of the repeat request.

For the purposes of the invention, the comparison between the message counter and the comparison counter is no longer carried out solely by the transmitting unit. The invention avoids the time-wasting return of each message counter in a data message by the receiving unit with the addition of the comparison counter. This considerably increases the transmission rate for data messages. Furthermore, the load on the connecting channels is reduced. For the purposes of the invention, the receiving unit compares message counters and comparison counters for a match. A repeat request is sent to the transmitting unit only if no match is found. The transmitting unit searches through the transmission buffer that is provided in it for data messages which have a message counter which matches the comparison counter of the repeat request. Once said data message has been found, it is sent once again via all the connecting channels to the receiving units. For the purposes of the invention, a repeat request is transmitted to the transmitting unit only if the receiver unit does not find any match. In other words, a repeat request is sent when the receiving unit misses a data message. This means that, after reception of a data message which does not immediately follow the most recently received data message in the predetermined clock sequence, now, in accordance with the incrementation rule, corresponds for example to the next but one data message, a repeat request is sent for the immediately following or next data message.

In contrast to this, the repeat request is sent even before the next but one data message has been received if a configurable waiting period has elapsed since the time at which the most recently received data message was received. The waiting period expediently ends shortly before the possible reception of the next but one data message.

The repeat request is expediently repeated continuously at fixed time intervals until the receiving unit receives a data message whose message counter corresponds to the comparison counter for the repeat request. In one preferred refinement of the invention, the repeat request is repeated only twice.

The receiving unit expediently rejects the reception of data messages whose message counter corresponds to that of already received data messages. According to this advantageous further development of the invention, there is no need to set up a preferred bus and a reversionary bus that is used only when required. For the purposes of this further development of the invention, the connecting channels are in fact used with equal priority, with the connecting channel via which the receiving unit receives a data message being irrelevant to it. The use or rejection of the received data message is dependent solely on whether a positive comparison has or has not already taken place between the message counter of the received data message.

At least two transmitting units are advantageously provided, and send the same data messages to one another with the same message counters. According to this advantageous further development of the invention, the transmitting units are designed redundantly, so that, if one transmitting unit fails, the second or substitute transmitting unit can take over the function of the transmitting unit which has failed.

It is also advantageous for at least two receiving units to be used, with each receiving unit being designed to send repeat requests. According to this expedient further development, the receiving units are also of redundant design, resulting in better operational reliability of the HVDC transmission installation.

Each receiving unit expediently stores the received data messages in a reception buffer. By way of example, the reception buffer is a so-called first-in-first-out memory, with the received data messages being stored in the reception buffer as a function of their message counter. This has the advantage that, if one data packet is missing or, in other words, one repeat request is transmitted, the reception of other data messages can continue even before the reception of the missing data message. The data message received as a consequence of a repeat request is then retrospectively incorporated in the memory address that had been kept free for it. However, the data is evaluated in the correct time sequence. This increases the data interchange rate. Those skilled in the art are very well acquainted with the use of pointers or the like for addressing memory locations, so that there is no need to describe this in any more detail at this point.

The storage capacity of the transmission buffer is advantageously configurable. This allows the method to be matched quickly and in an uncomplicated manner to widely differing requirements for high-voltage direct-current transmission.

According to one preferred exemplary embodiment of the method according to the invention, the data message is set by means of a transmission protocol without a connection and without acknowledgement. One such transmission protocol, for example, is the UDP broadcast protocol. The UDP broadcast protocol is known per se to those skilled in the art, so that there is no need to describe it in any more detail at this point. Protocols without connections and without acknowledgements have the advantage that they allow particularly fast data transmission, without any check of the protocol that the connection has been successfully set up.

In contrast to this, a TCP/IP protocol is used for transmission of the data messages. The TCP/IP protocol is a connection-oriented program which requires acknowledgement.

Further expedient refinements and advantages of the invention are the subject matter of the following description of one exemplary embodiment of the invention, with reference to the figure in the drawing, in which:

BRIEF DESCRIPTION OF THE SEVERAL VIEWS OF THE DRAWING

FIGURE the FIGURE shows a schematic illustration of a connection network for an HVDC transmission installation.

DESCRIPTION OF THE INVENTION

FIG. 1 shows, schematically, a connection network 1 for an HVDC transmission installation. The HVDC transmission installation has a series of redundant protective devices 1a, 1b or control devices 2a, 2b which are used to control the components of a substation, which is not illustrated, in an HVDC transmission installation. Those components of the connection network 1 which are associated with a first substation are provided with the reference symbol 3.

Each protective device is connected via a redundant connecting channel 4a and 4b to a likewise redundant control station 5a or 5b, respectively. The control stations 5a and 5b each have a visual display unit 6. The connecting channels 4a and 4b also have so-called switches 7 or routers 8 which simplify the addressing process for data interchange. Those components of the connection network 3 which are associated with the first substation are connected via a connecting line 9a and 9b, which is illustrated only briefly in schematic form here but in practice is longer and is of redundant design, to the components 10 of the connection network 1 which are associated with a second substation in the HVDC transmission installation. The second substation comprises redundant protective devices 1a and 1b, and/or control units 2a and 2b, corresponding to the first substation, and these are connected via connecting channels 4a and 4b once again to the respective control station 5a or 5b.

A UDP broadcast protocol is used to interchange data between the control station 5a and, for example, the protective device 1a. By way of example, the control station 5a acts as the transmitting unit in communication between the control station 5a and the protective device 1a. The control station has internal logic which converts control commands entered manually by a user to a data message. A message counter is also added and is incremented by 1 by the transmission of a data message. The message is then sent from the control station 5a via the connecting channel 4a and via the connecting channel 4b to the receiving unit, in the form of the protective device 1a. Following the reception of a previous data message, the protective device 1a incremented a comparison counter, which is incremented using the same incrementation rule as the message counter in the control station. In the described exemplary embodiment, the data message is received via the connecting channel 4a before the data message with the same contents from the connecting channel 4b. The protective device 1a compares the message counter in the data message with the comparison counter. Since they match, the protective device 1a stores the data message in the reception buffer for further processing. This completes the data interchange.

In the event of a fault or disturbance in the connecting channel 4a, the protective device 1a will receive the data message via the sound data channel 4b.

If a data message is lost in both transmission channels 4a and 4b while being transmitted from the control station 5a to the protective device 1a, the protective device 1a will receive a data message whose message counter has been incremented by two or more incrementation steps in comparison to the message counter most recently received by the protective device 1a. The protective device then sends a repeat request to the control station 5a, with the repeat request having the comparison counter which corresponds to the message counter for the data message that has not been received. After reception of the repeat request, the control station 5a uses the comparison counter received with the repeat request to access a transmission buffer in which the data messages which have been sent recently are buffer-stored. The control station 5a then once again sends a data message, whose message counter corresponds to the comparison counter in the repeat request, to the receiving unit in the form of the protective device 1a.

The communication between the protective devices 1a, 1b and the control unit takes place on the basis of a TCP/IP protocol.

The invention claimed is:

1. A method for safe and secure transmission of data messages between at least one transmitting unit and at least one receiving unit in an HVDC transmission installation, wherein each transmitting unit is connected to each receiving unit via at least two connecting channels, the method which comprises:

providing each data message with a message counter uniquely identifying that data message, and each transmitting unit sending the data message via all the connecting channels to each receiving unit, thereby calculating the message counter using an incrementation rule that is clocked by a transmission of the data messages, and each receiving unit calculating a comparison counter using the same incrementation rule, clocked by a reception of the data messages;

storing, with each transmitting unit, data messages that have already been transmitted in a transmission buffer;

comparing, with the receiving unit, the message counter of each received data message with the comparison counter, and, if there is no match between the message counter and the comparison counter or if there is no match within a waiting period after reception of a data message, sending a repeat request to the transmitting unit to send a data message with a message counter corresponding to the comparison counter;

upon receiving the repeat request, accessing the transmission buffer with the transmitting unit and sending the data message via all the connecting channels whose message counter corresponds to the comparison counter received by way of the repeat request; and providing at least two transmitting units and sending the same data messages to one another with the same message counters with the at least two transmitting units.

2. The method according to claim 1, wherein the receiving unit rejects the reception of data messages whose message counter corresponds to that of data messages which have already been received.

3. The method according to claim 1, which comprises utilizing at least two receiving units, each configured to send repeat requests.

4. The method according to claim 1, which comprises storing the received data messages in a reception buffer with each receiving unit.

5. The method according to claim 1, wherein a storage capacity of the transmission buffer is configurable.

6. The method according to claim 1, which comprises sending the data message by way of a transmission protocol without a connection and without acknowledgement.

* * * * *